D. B. WHISTLER.
OPERATING MECHANISM FOR FARE RECORDERS, FARE INDICATORS, AND THE LIKE.
APPLICATION FILED JAN. 30, 1913.
1,169,446.
Patented Jan. 25, 1916.
3 SHEETS—SHEET 1.
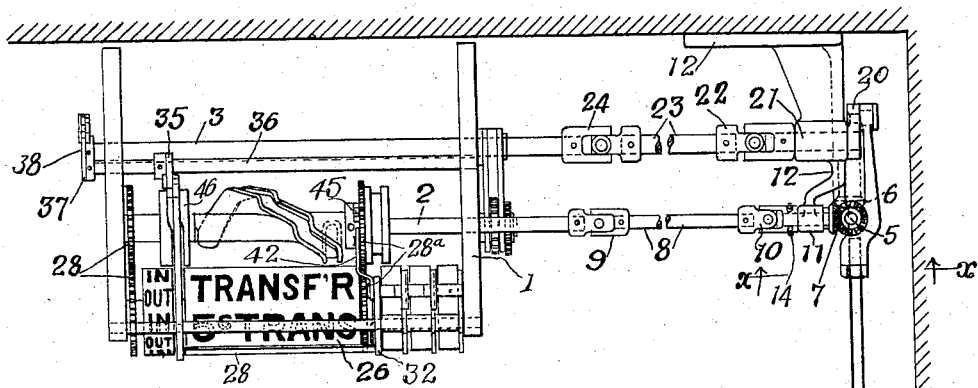
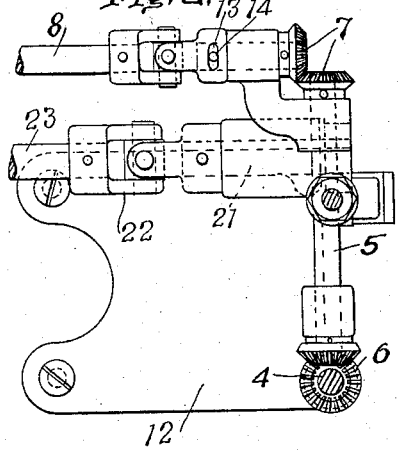
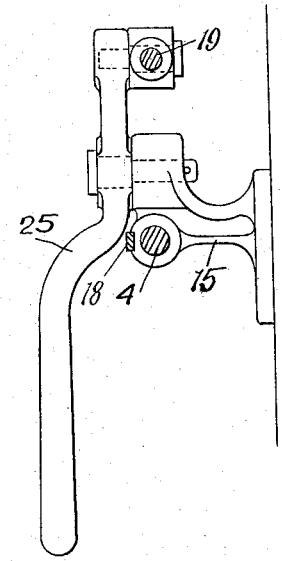
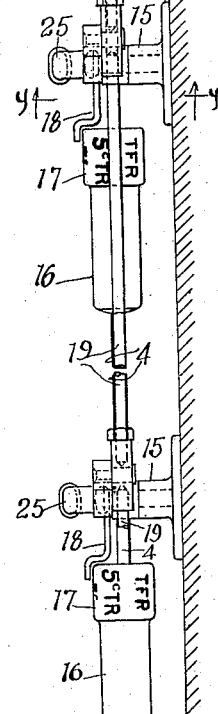
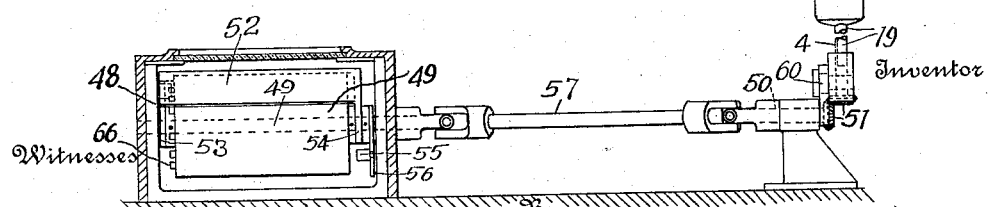

D. B. WHISTLER.
OPERATING MECHANISM FOR FARE RECORDERS, FARE INDICATORS, AND THE LIKE.
APPLICATION FILED JAN. 30, 1913.
1,169,446.
Patented Jan. 25, 1916.
3 SHEETS—SHEET 2.
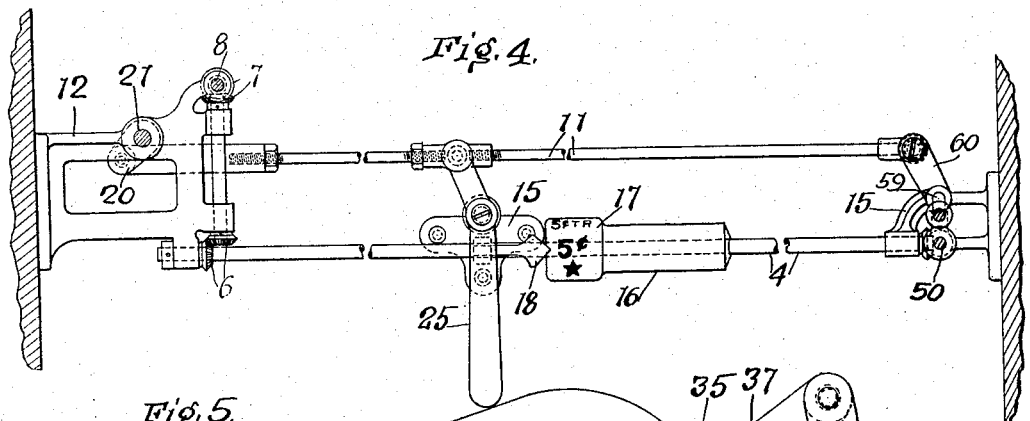
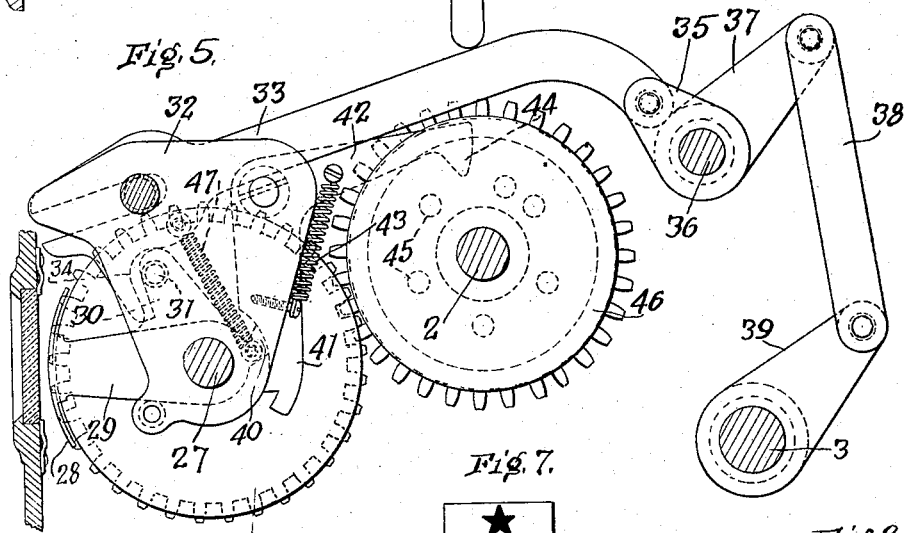
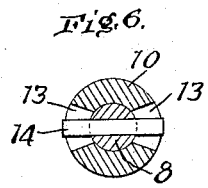
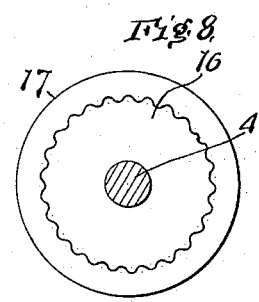
Witnesses
G. Howard Walmsley.
Harriet L. Hammaker.
Inventor
David B. Whistler,
By Toulmin & Toulmin,
Attorneys
THE COLUMBIA PLANOGRAPH CO., WASHINGTON, D. C.

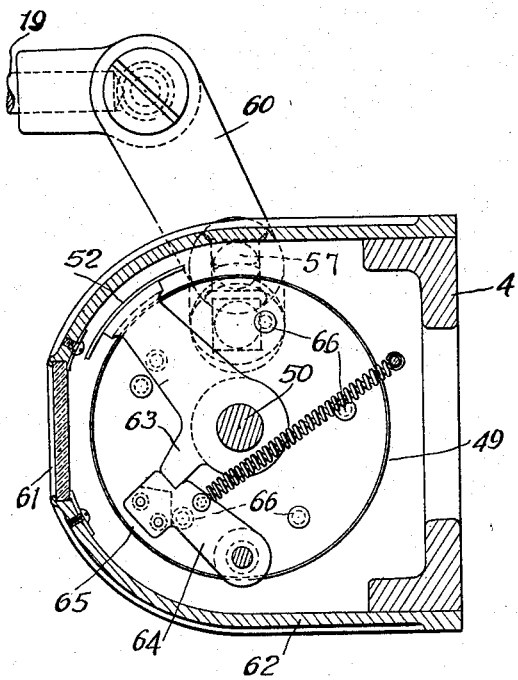
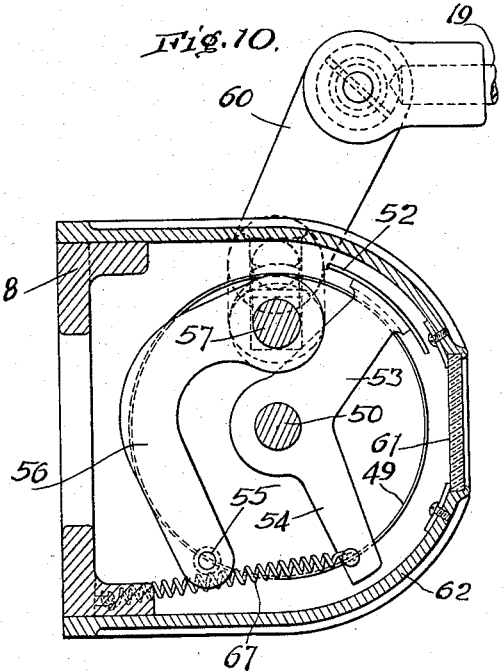
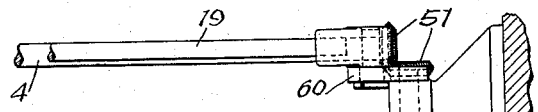

UNITED STATES PATENT OFFICE.

DAVID B. WHISTLER, OF DAYTON, OHIO, ASSIGNOR TO THE RECORDING AND COMPUTING MACHINES COMPANY, OF DAYTON, OHIO, A CORPORATION OF OHIO.

OPERATING MECHANISM FOR FARE-RECORDERS, FARE-INDICATORS, AND THE LIKE.

1,169,446.  Specification of Letters Patent.  Patented Jan. 25, 1916.

Application filed January 30, 1913. Serial No. 745,104.

*To all whom it may concern:*

Be it known that I, DAVID B. WHISTLER, a citizen of the United States, residing at Dayton, in the county of Montgomery and State of Ohio, have invented certain new and useful Improvements in Operating Mechanism for Fare-Recorders, Fare-Indicators, and the like, of which the following is a specification, reference being had therein to the accompanying drawing.

This invention relates to operating mechanism for fare recorders, fare indicators and the like.

The object of the invention is to provide a simple, compact and easily operated mechanism for setting and operating fare recorders and fare indicators.

A further object is to provide mechanism to cause an indication of the fare recorded to be exhibited at one or more points in the car simultaneously with the recording of the fare and to prevent the exhibition of a different fare indication until such different fare has been recorded.

It is also an object of the invention to provide an actuating device for the setting rod which will combine in itself an indicator, thus locating the indicating gage, by means of which the recorder and indicator are set, in a convenient position where it is easily read by the conductor while he is in the act of setting the recorder.

In the accompanying drawings, Figure 1 is a plan view of a mechanism embodying my invention; Fig. 2 is a sectional view taken on the line *x x* of Fig. 1 and looking in the direction of the arrows; Fig. 3 is a section taken on the line *y y* of Fig. 1 and looking in the direction of the arrows; Fig. 4 is a front elevation of the operating rods and handles partially broken away; Fig. 5 is an end elevation showing in detail the fare indicator at the recorder end of the mechanism and the controlling devices therefor; Fig. 6 is a sectional view of the joint forming the floating connection in the operating rods; Fig. 7 is a lay out of the indicator on the setting handle; Fig. 8 is an end elevation of the combined handle and indicator; Fig. 9 is an end elevation of the individual indicator at that end of the mechanism opposite the recorder; Fig. 10 is an elevation of the end of said indicator opposite that shown in Fig. 9; and Fig. 11 is a plan view of said indicator, partially broken away.

In these drawings I have illustrated one embodiment of my invention and have shown the same as comprising two rods preferably arranged longitudinally to the car. One of these rods is capable of rotary movement and is operatively connected with the setting mechanism of the register. The other is capable of reciprocatory movement and is connected with the operating mechanism for the register. The rotary rod is also connected with the indicators and the reciprocating rod is so connected with the indicator mechanism as to control the exhibtion of the fare indication.

A fare recorder 1 of any desired construction is mounted at a suitable point in the car, usually on one of the end walls thereof and comprises a setting shaft 2, by means of which the recorder is set to cause it to record the particular fare which has been received and an operating shaft 3 which is connected by means of suitable gearing with the recording mechanism to cause the machine to be operated to record the particular fare for which it has been set. This mechanism is of a known construction and need not be here shown or described in detail as none of the elements thereof, other than the setting and operating shafts, enter into the present invention. The setting shaft 2 of the machine is operatively connected with the rotary or setting rod of the operating mechanism in such a manner that the movement of the latter will be transmitted to said setting shaft. In the present instance the setting rod 4 is connected with the setting shafts through suitable gearing and universal joints. In order that the setting rod may be placed low enough in the car to be readily grasped by the conductor a short vertical shaft 5 is preferably interposed between the rod and the setting shaft. This vertical shaft is connected with the setting rod 4 by means of bevel gearing 6 and is connected by means of other bevel gearing 7 with a shaft 8 which is connected by means of a universal joint 9 with the shaft 2. The shaft 8 is divided into two portions connected together by a universal point 10 and one part of this shaft is mounted in a bearing 11 carried by a bracket 12 secured to a fixed part of the car. I prefer to provide one or more floating connections between the setting rod and the setting shaft. In the present instance I have shown one part of the universal joint 9 as provided with enlarged openings 13 on the opposite sides thereof to receive a pin 14 which extends through that portion of the shaft 8 which enters the universal joint, thus allowing the shaft 8 a certain amount of rotary movement relatively to the setting shaft 2 and making it unnecessary that the setting rod 4 should be moved into a position to set the recorder accurately and making it possible for the alining devices of the recorder to adjust the setting shaft without moving the entire train of setting mechanism on the exterior of the recorder.

The setting rod 4 is supported at intervals along its length by brackets 15 and is provided with a series of hand gripping devices or handles 16, by means of which it may be rotated to operate the setting mechanism and the recorder. Connected with each handle and preferably formed integral therewith is a drum 17, which is here shown as somewhat greater in diameter than the handle 16 and which has on its periphery a series of fare indications corresponding with the fares the recorder is adapted to handle and with the indications on the fare indicators. These drums may be arranged adjacent to the several brackets 15 and the corresponding brackets provided with pointers 18 to move over the periphery of the drum to indicate the particular fare indication thereon, the pointers and the fare indications being so arranged relatively one to the other that the particular fare indicated by the pointer will correspond with the fare which the register is set to record and which is shown on the fare indicators. This arrangement provides an indicator-guide close to and easily readable by the conductor during the act of setting the recorder. Further, it is very simple and positive in its character and does not occupy any unnecessary space in the car.

The reciprocating or operating rod, 19, is so connected with the operating shaft of the recorder that the reciprocation of the rod will impart rotary movement to the shaft. To accomplish this that end of the rod adjacent to the recorder is connected with a crank arm 20 carried by a short shaft 21 journaled in the bracket 12 and connected by a universal joint 22 with a shaft 23 which, in turn, is connected by a universal joint 24 with the shaft 3. Reciprocatory movement may be imparted to the rod 19 in any suitable manner, but preferably this is done by means of a handle connected therewith and arranged adjacent to the handle 16 on the setting rod 4 so that the conductor can quickly move his hand from one handle to the other. As here shown the handle is in the form of a lever 25 pivotally mounted between its ends on the bracket 15 and having its upper end pivotally connected with the rod 19.

Mounted at that end of the car adjacent to the recorder 1 and, in the present instance, mounted on the frame of the recorder itself is an indicator comprising a drum 26 having on the periphery thereof fare indications adapted to be moved step by step in unison with the setting mechanism of the recorder. This drum is carried by a shaft 27 and connected by gearing 28$^a$ with the setting shaft so that the particular fare exhibited by the drum will correspond with the fare which the recording mechanism is set to record. Means are provided for controlling the exhibition of the fare indications so that a particular indication will be exhibited only when that fare has been actually recorded and to prevent the exhibition of a different fare indication until such different fare has been recorded. To this end a shield or "flash" 28 is provided and is so controlled that it will rest normally between the sight opening and the drum, thus hiding from view the indication which is in alinement with the sight opening. This flash is so connected with the operating mechanism that when the recorder is operated it will be moved out of alinement with the sight opening, thus exhibiting the fare. As here shown the flash is carried by arms 29, one of which has a projection 30 having a lateral projection or pin 31. Slidably mounted upon a frame member 32 arranged at one end of the drum is a rod 33 having a depending hook-shaped portion 34 extending in front of the projection 31 on the arm 30. The rod 33 is connected at its rear end with a crank 35 mounted on a shaft 36 journaled in the recorder frame. The shaft 36 has a crank arm 37 connected by a link 38 with a similar arm 39 on the operating shaft 3. Consequently, the operating movement or rocking motion of the operating shaft 3 will be transmitted through the shaft 36 to the reciprocatory rod 33, thus causing the hook 34 carried by that rod to engage the projection on the arm 30 and raise the flash into its inoperative position. A resilient detent is provided for retaining the flash in its inoperative position after the operating mechanism has been returned to its normal position. As here shown the arm 29 has a projection 40 and a finger or pawl 41 is pivotally mounted at a point above the drum and has its lower end provided with a notch to engage the edge of the projection 40, a spring being provided to move the finger into engagement with the projection on the arm 29. In the present construction the pawl 41 has rigidly secured thereto a finger 42 and a spring 43 is connected at one end to this finger and at the other end to the frame member 32. The finger 42 has a nose 44 which, when the pawl 41 is in engagement with the projection 40 on the arm 29, will extend into the path of pins 45 on a part operatively connected with the setting shaft 2. In the present instance these pins are mounted on one face of the cam disk 46 which is mounted on the setting shaft 2, rotates therewith and forms a part of the usual recorder mechanism. In this manner the movement of the setting mechanism to change the fare indication will move the pawl 41 out of engagement with the projection 40 and permit the flash to move downward into alinement with the sight opening. If desired a spring 47 may be provided to accomplish or assist in the downward movement of the flash. It will be noted that the pins 45 are spaced equal distances apart excepting in a single instance in which two pins are placed quite close together. When these pins are moved into alinement with the nose 44 the setting mechanism is in a neutral position and these pins will prevent the pawl 41 engaging the nose 40 and consequently will prevent the flash from being held in its inoperative position.

If desired fare indicators may be placed in different parts of the car and it is often desirable, particularly in the case of long cars, to have an indicator at each end of the car and I have, in the present drawings, shown an indicator mounted at that end of the car opposite the recorder. This indicator, which is shown as a whole at 48, is similar in its general features of construction to the one mounted on the recorder frame. As here shown it comprises a drum 49 having the fare indications on the cylindrical surface thereof and mounted on a shaft 50 which is connected by means of suitable bevel gearing 51 with the setting rod 4 and may, if desired, be provided with universal joints, as shown. Consequently, this drum rotates in unison with the drum 26 of the other indicator. The indicator 48 is also provided with a shield or flash 52 which is carried by arms 53 loosely mounted on the shaft 50. One of the arms 53 has depending therefrom a finger 54 arranged in the path of a projection 55 carried by a rock arm 56 mounted at one end of the cylinder shown at 57 and connected, by means of a shaft 59 with an arm 60 which is operatively connected with the operating rod 19. The reciprocation of the rod 19 will rock the arm 56 to cause the projection or pin 55 to engage the finger 54 and move the flash out of alinement with the sight opening 61 in the casing 62 which incloses the drum. The arm 53 at the opposite end of the cylinder also has a finger, 63, adapted to be engaged by a spring-pressed pawl 64 to retain the flash in its inoperative position. This pawl is provided on its inner face with a tapered nose 65 arranged in the path of pins 66 secured to the end of the cylinder. Consequently, any rotation of the cylinder will cause one of the pins to engage the inclined nose on the pawl and force the same out of engagement with the finger 63 of the flash and permit the flash to return to its normal position, a spring 67 being provided to accomplish or assist in this return movement of the flash.

The operation of the mechanism will be readily understood from the foregoing description and it will be apparent that I have provided a very simple, compact operating mechanism which is so constructed and arranged that it can be readily operated by the conductor and which is provided with setting indications or guides arranged close to the operating handles so that they can at all times be readily seen by the conductor. Further, it will be apparent that I have provided indicators which will exhibit the fare indication only after the corresponding fare has been recorded; which will prevent a different fare being exhibited on the indicator until such different fare has been recorded. The mechanism as a whole not only facilitates the work of the conductor but provides a very effective check upon his operations. The indicator guides are so arranged that he can always have an unobstructed view of the same while in the act of setting the recorders and indicators and the fare indicators themselves are so arranged in the car as to be readily visible to all persons therein and are so controlled that they will exhibit only the fare last recorded and cannot be caused to indicate a fare different from the one last recorded.

While I have shown and described one embodiment of my invention it will be understood that this has been chosen for the purposes of illustration only and that I do not desire to be limited to the details of construction shown and described, for obvious modifications will occur to a person skilled in the art.

Having thus fully described my invention, what I claim as new and desire to secure by Letters Patent, is:—

1. A hand grip for a rotatable setting rod comprising a body portion to be grasped by the hand and having at one end of said body portion a part forming a drum, said drum being provided on its periphery with fare indications.

2. The combination, with a fare indicator, of a rotatable setting rod operatively connected with said indicator, a hand grip mounted on said rod to rotate the same and provided at one end with an enlarged portion having fare indications thereon, and a pointer mounted on a fixed support adjacent to said enlarged portion of said hand grip and coöperating therewith to guide the operator in setting said indicator.

3. An operating mechanism of the character described comprising a rotatable setting rod, and a reciprocatory operating rod, a hand grip mounted on said setting rod and having at one end a drum provided on its periphery with fare indications, a bracket mounted on a fixed support adjacent to said hand grip, a pointer carried by said bracket and coöperating with said drum, and a lever pivotally mounted on said bracket, connected with said reciprocatory rod and having one end arranged to form a handle.

4. The combination, with two fare indicating mechanisms spaced apart, of operating mechanism to simultaneously actuate both fare indicators, said operating mechanism comprising a rotatable rod having a series of handles for imparting rotation thereto, indicator drums mounted on said rod close to the ends of the respective handles, fixed pointers mounted adjacent to the respective indicator drums, a reciprocatory rod operatively connected with said indicators, and a series of actuating levers connected with said reciprocatory rod at intervals between said indicators and adjacent to said handles.

5. The combination, with a fare recorder, a fare indicating mechanism arranged adjacent to said recorder, and a second fare indicating mechanism arranged at a point remote from said recorder, each indicating mechanism comprising a rotatable drum, and a flash arranged to normally conceal the indication on the drum, of a setting rod connected with said indicator and both of said drums to set the same to register and indicate, respectively, a particular fare, a series of hand grips mounted on said setting rod, guiding indicators arranged adjacent to the respective hand grips, and a longitudinally reciprocal rod operatively connected with said register to register said fare and with the flashes of both indicating mechanisms to move the same into an inoperative position, and a series of handles connected with said operating rod and arranged adjacent to the respective hand grips on said setting rod.

6. The combination, with a fare recorder, a fare indicating mechanism arranged adjacent to said recorder, and a second fare indicating mechanism arranged at a point remote from said recorder, each indicating mechanism comprising a rotatable drum, and a flash arranged to normally conceal the indication on the drum, of a setting rod connected with said indicator and both of said drums to set the same to register and indicate, respectively, a particular fare, a series of hand grips mounted on said setting rod, guiding indicators arranged adjacent to the respective hand grips, and a longitudinally reciprocal rod operatively connected with said register to register said fare and with the flashes of both indicating mechanisms to move the same into an inoperative position, a series of handles connected with said operating rod and arranged adjacent to the respective hand grips on said setting rod, a detent to hold said flashes in their inoperative positions, and means actuated by the movement of said setting rod to release said flashes from said detent.

In testimony whereof I affix my signature in presence of two witnesses.

DAVID B. WHISTLER.

Witnesses:
F. W. SCHAEFER,
S. GEORGE TATE.